No. 696,996. Patented Apr. 8, 1902.
C. P. MOTT.
PORTABLE HOUSE.
(Application filed Apr. 23, 1901.)
(No Model.) 3 Sheets—Sheet 1.
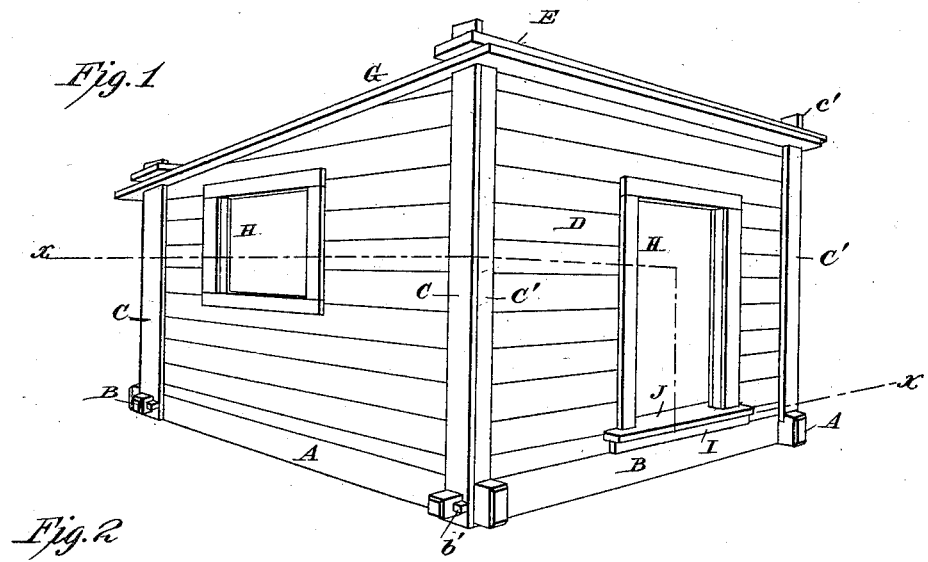
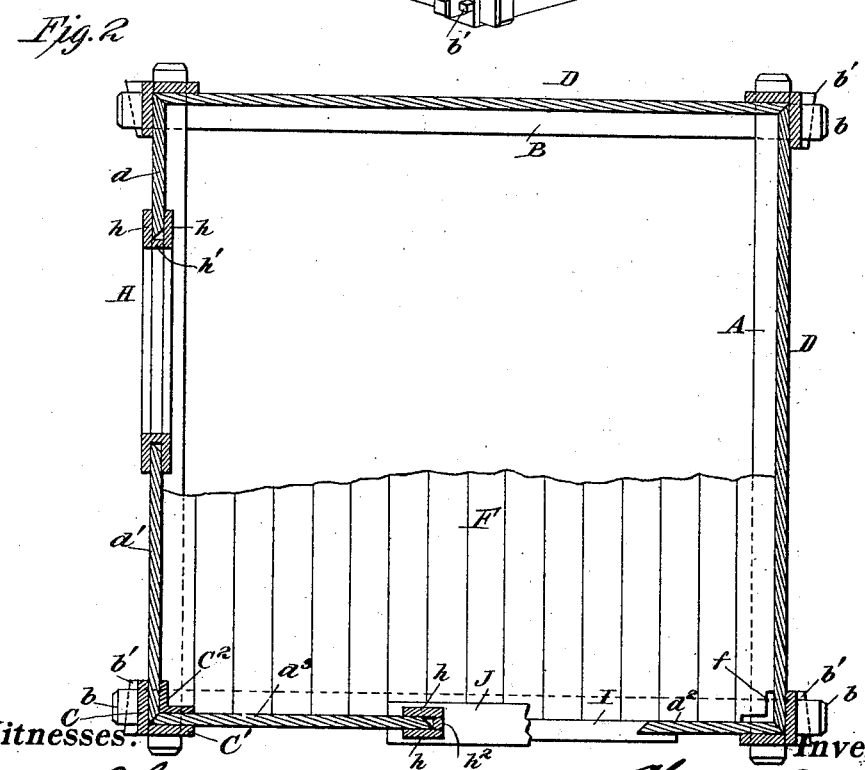

No. 696,996. Patented Apr. 8, 1902.
C. P. MOTT.
PORTABLE HOUSE.
(Application filed Apr. 23, 1901.)
(No Model.) 3 Sheets—Sheet 2.
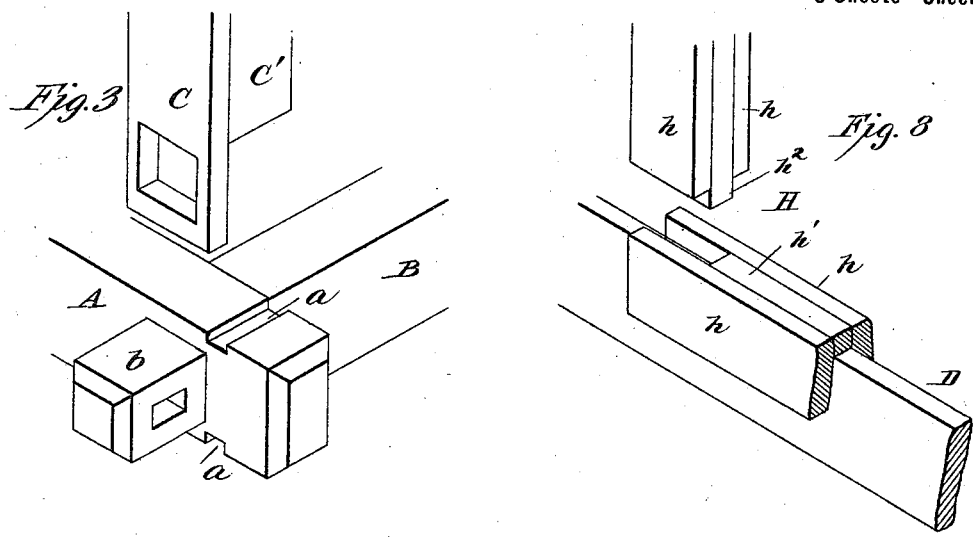
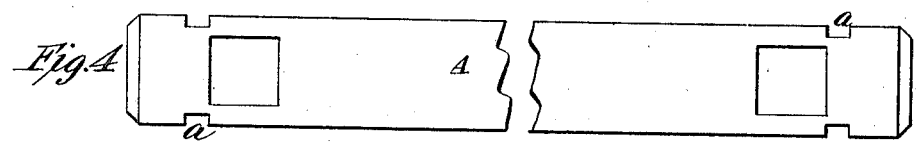
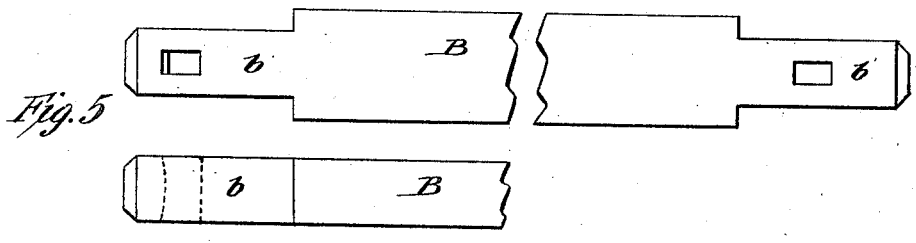
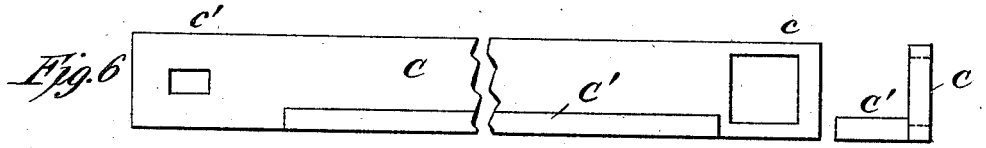
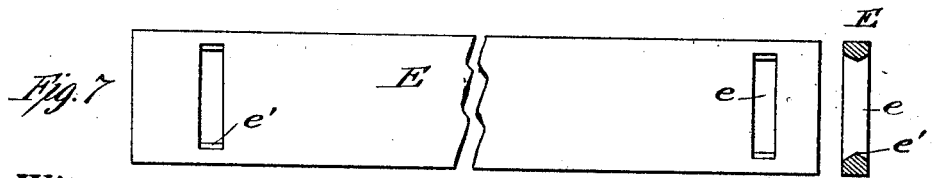
Witnesses:
Jas. F. Coleman
Jno. R. Taylor
Inventor
Charles P. Mott
By Wyer, Edmunds & Wyer
Att'ys.

No. 696,996. Patented Apr. 8, 1902.
C. P. MOTT.
PORTABLE HOUSE.
(Application filed Apr. 23, 1901.)
(No Model.) 3 Sheets—Sheet 3.
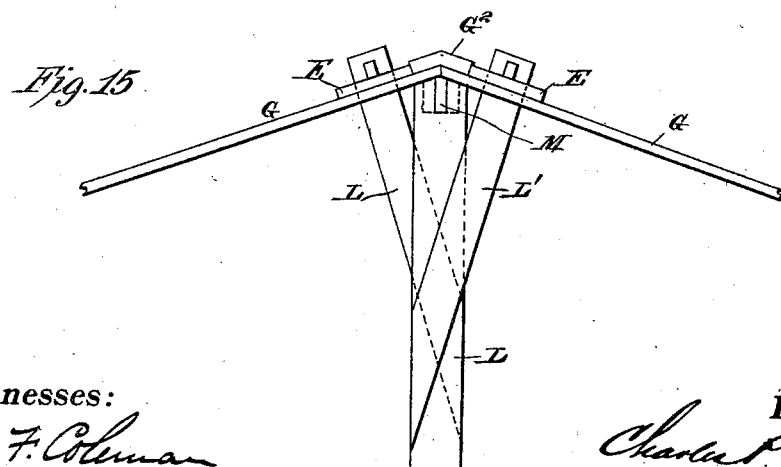

UNITED STATES PATENT OFFICE.

CHARLES P. MOTT, OF MILFORD, PENNSYLVANIA.

PORTABLE HOUSE.

SPECIFICATION forming part of Letters Patent No. 696,996, dated April 8, 1902.

Application filed April 23, 1901. Serial No. 57,050. (No model.)

*To all whom it may concern:*

Be it known that I, CHARLES P. MOTT, a citizen of the United States, residing at Milford, in the county of Pike and State of Pennsylvania, have invented a certain new and useful Improvement in Portable Houses, of which the following is a specification.

The object of my invention is to produce a structure in which the parts are readily put together or separated and in which the walls, roof, and flooring will be separable into pieces admitting of easy transportation.

A further object is to produce a structure in which the parts for each side thereof are interchangeable, so that the windows and doors, for instance, may be located on any side of the structure or the height of the sills varied.

A further object is to produce a structure in which nails, screws, bolts, and similar fastening devices are entirely dispensed with.

My invention is illustrated in the accompanying drawings, in which—

Figure 1 is a perspective view of a wooden house embodying the features of my invention; Fig. 2, a sectional view on the line $x\ x$ of Fig. 1; Fig. 3, a perspective view of one corner of the wall-sills, showing the method of securing the same together and to the corner-uprights, which secure the corners of the side walls; Figs. 4 and 5, detail views of the pieces for the wall-sills; Figs. 6 and 7, detail views of the corner-uprights and the top cross-braces thereof, which also serve to secure the roof-boards; Fig. 8, a perspective view showing the joint between the window sills or lintels and the jamb; Fig. 9, a detail view of the piece used for the window-sills and for the window and door lintels; Fig. 10, a detail view of the piece used for the window and door jambs; Fig. 11, a detail view of the door-subsill; Fig. 12, a detail view of the door-sill; and Figs. 13, 14, and 15 show modifications.

Referring to the drawings, the parts lettered A and B represent the wall-sills, the corners being mortised together. The tenons $b$ of sills B project through mortises in sills A and are slotted to receive locking-wedges $b'$. The outer walls of these slots are rounded or beveled from opposite sides, so that the slots will be narrower at the center, as shown in Fig. 5, whereby a single wedge will take a firmer hold than would be the case with slots of uniform width, and the wedge may be driven from either side. The corner-uprights are right-angled pieces, preferably made of two pieces C and C', secured together at the corner. Pieces C each have extensions $c$ and $c'$, the former overlapping sill-pieces A and the latter projecting through slots in the end roof-boards. Extensions $c$ are mortised to receive tenons $b$, and wedges $b'$ are driven through the tenons outside of the extensions, so that the extensions will be held firmly against the sides of sills A. These sills are slotted at $a$, as shown in Figs. 3 and 4, to receive the ends $c^2$ of pieces C' to more securely anchor the corner-uprights and reduce the strain on extensions $c$, and, further, to relieve the joint between the pieces C and C', forming the uprights, from the strain caused by the wedging action of the ends of the boards forming the side walls, as will appear hereinafter. Slots $a$ are provided upon opposite sides of sills A in order that the sills may be reversed.

The walls D are made up of boards laid longitudinally and have either tongue-and-groove, rabbeted, or other suitable joints. The ends of the boards are cut to form miter-joints at the corners of the structure, as shown in Fig. 2. It will be seen by reference to Fig. 2 that when the corner-uprights are drawn together and secured by tie-boards E, Fig. 1, which are laid across the roof-boards, a very close and covered joint is formed at each corner of the structure. This form of joint dispenses with all forms of anchoring devices and requires no inside braces to secure the walls against inward collapse. As an additional means for security, however, and for producing a still closer joint at the corners I may provide, if desired, the inside corner-upright $C^2$. (Shown in position in the lower left-hand corner of Fig. 2.) This upright is a rectangular piece held in position at the bottom by recess $f$, formed by cutting away the corners of the floor-boards F, as shown at the lower right-hand corner of Fig. 2, so that pieces $C^2$ will rest upon the sills. At the top these pieces are held in position by cleats $g'$, secured to the under side of the end roof-boards, as shown in Fig. 13. The outside corner-uprights secure the walls against outward collapse, said uprights being held together in one direction by tie-boards E and in the other direction by the end roof-boards, which are provided with slots through which extensions $c'$ project, said end boards thus serving the same purpose as tie-boards E. Each board E is provided with two slots $e$, Fig. 7, through which extensions $c'$ of pieces C project, and in forming the slots the edges $e'$ are beveled from both sides, whereby the tie-boards may be reversed or interchanged, which could not be done if the slots were cut at an angle from one side only. These tie-boards also serve to hold down the roof-boards G. For simplicity the roof is preferably given a slant in one direction with the peak at the front, and for this purpose the top boards for the side walls are tapered to make a close fit. The floor-boards F are laid on the wall-sills A and B, with the edges abutting on the first or lower wall-boards D, thus giving additional security to the walls. The boards will be of any suitable material and may have any of the forms of joints commonly employed in flooring material.

The window-casings are formed of pieces H, Figs. 9 and 10, composed of facings $h$, secured to a connecting-web to form a piece U-shaped in cross-section, into which the wall-boards are inserted, as shown in Fig. 2. The sill and lintel piece is shown in Fig. 9, in which the connecting-web $h'$ is shown shorter than the facings $h$, the length of the web being equal to the width of the window-sash. The side piece or jamb of the casing is shown in Fig. 10, in which the facings $h$ are equal to the height of the window-sash, so as to fit between the facings of the sill and lintel, (see Fig. 1,) and the connecting-web $h^2$ is shown longer than the facings, the length of the projection being equal to the thickness of webs $h'$, and which projections are inserted between the facings of the sill and lintel pieces (see Fig. 8) when putting the parts in position, so that the web $h'$ will hold the jambs in position. In building up the side wall, which is to be provided with the window, a number of wall-boards are placed edge on upon the sill A until the desired height for the window-sill is reached. The sill-piece of Fig. 9 is then placed in position, then the short wall-boards $d$ and $d'$. Then the jambs are placed in position, the lower tongues or projections on web $h^2$ entering between the facings $h$ of the sill and filling the space between the end of web $h'$ and the beveled ends of boards $d$ and $d'$ (see Fig. 2) and the facings of the jambs straddling the ends of the boards. After this the lintel is placed in position, the upper tongues or projections on webs $h^2$ entering between the facings resting upon the upper ends of the jamb-facings. The next wall-board is now placed in position between the facings of the lintel, and then the remainder of the wall-boards are put up, the top board being tapered to match the end roof-board. In constructing the parts for the side wall containing a window the short boards will be cut so that the top edge of the uppermost boards $d$ and $d'$ will be flush with the upper side of web $h'$ of the lintel, so that the next long board will match joints with the uppermost boards $d$ and $d'$.

It will be seen from the foregoing description and by reference to Fig. 2 that boards $d$ and $d'$ may be changed so that the boards $d'$ will be toward the rear and that the window-casing will be then nearer the front of the structure without recutting or in any way altering the original form or length of the parts, the boards being mitered at both ends to permit the change without the necessity of reversing the boards. The window-sash is omitted, but it will be understood that it will be held in place by cleats or pivots or in any other suitable manner.

The door-casing is made up the same as the window-casing, except the sill. The lintels are of the same length and interchangeable, and the jambs are of the same shape as the window-jambs, but of course are longer. The sill is preferably made up of subsill I and sill J, Figs. 11 and 12. In building up the front wall, in which the door will usually be placed, the lowermost short boards $d^2$ and $d^3$ are first placed in position, and then subsill I is placed between the ends of those boards, the beveled ends entering cuts I, Fig. 2, and the extensions $i'$ projecting in front of the boards. Sill J is then placed directly upon the subsill with the projections straddling boards $d^2$ and $d^3$. Projections $J'$ are slightly greater in width than the thickness of the jamb-facings and the projections are longer than the width of the facings, so as to give a more finished appearance. Projections $J'$ and extensions $i'$ are of sufficient length to insure the maintenance of boards $d^2$ and $d^3$ in alinement. The tongues or projections $h^2$ of the door-jambs enter the slots in the sill J and fill the space between the beveled ends of the boards and the ends of the slots. When the door-jambs and lintels are in position, the remainder of short boards $d^2$ and $d^3$ are placed in position, the upper edge of the last one being flush with the upper side of web $h'$ of the lintel, and then the long boards are placed in position. The door will be hung to the jamb in the usual manner. I prefer to employ hinges having separable leaves, so that the door may be readily removed or placed in position; and it will be understood that by inverting the jamb to which the hinges are secured or interchanging the jambs the door may be arranged to open inwardly or outwardly and either to the right or left, the latching-plate for the door-lock being arranged and located on the locking-jamb, so that the latch will properly engage therewith.

From the foregoing it will be seen that the position of boards $d^2$ and $d^3$ may be changed and that the door may be placed nearer the left wall, if desired. It will also be seen that since the walls are of the same length the position of the window and door may be interchanged or that either the window or the door might be placed in the rear or right walls without recutting or altering any of the parts.

The roof-boards G are laid upon the wall-boards D and, as above stated, are held down by tie-boards E, which are provided with two slots, through which projections $c'$ of the corner-uprights extend. The tie-boards are held in position by wedges $c^3$. To prevent the roof-boards slipping down, cleats may be secured to the under side of the boards, so as to engage either or both top boards of the front and rear walls, or when the ordinary tongue-and-grooved boards are employed the tongue may be cut away for a short length and a corresponding block $g$ inserted in the groove directly opposite. Each board being similarly provided, it will be seen that when the tongues of the roof-boards are forced into the grooves of the adjacent boards that the blocks in the grooves will enter the notches in the tongues, and thus prevent the boards slipping upon each other, and since the end boards are held by projections $c'$ all the boards will be held against slipping, as shown in Fig. 13. This figure also shows battens G', with which the roof-boards are provided, if desired, and, as shown, these battens are placed under the tie-boards E.

In Figs. 14 and 15 I have shown how the structure may be constructed when the roof slopes both ways with the peak in the center, a construction which will be employed in large houses. In these figures a middle sill B' is employed, the connection with sills A being the same as with sills B. L is a center upright, there being one on each side, having extensions $l$, like extensions $c$ of the corner-uprights, and which are mortised to sill B' in the same manner. Above the sill upright L is undercut, as shown in Fig. 14, to receive the beveled ends of the wall-boards, this undercut portion projecting over and being seated upon sill A. The upper end of piece L is slotted, as shown in Fig. 15, to receive the tenon of a beam M, which supports the roof-boards at the peak, the abutting ends being covered by ridge-board $G^2$. To secure the roof-boards at the peak, upright L is provided with two arms L', which correspond to extensions $c'$ and project through the slots in the end roof-boards as in the structure of Fig. 1 and with which the tie-boards E coöperate to hold the side walls together and to hold down the roof-boards. Instead of employing ridge-board $G^2$ tie-boards E may be made wider, so as to meet at the peak, and thus perform the function of the ridge-board. Sill B and side upright L may be employed with the structure of Fig. 1, if desired, to provide additional support for the floor and roof boards. In such case, however, side uprights L will not be provided with arms L', but will have single straight extensions extending through slots in the end roof-boards, which will be secured together by tie-boards E and wedges, or instead of pieces L side pieces like part C of the corner-uprights might be employed and secured in the same manner. In either case the side upright and wall-boards will be slotted to receive the tenon of beam M.

What I claim is—

1. In a portable house, the combination of wall-boards laid longitudinally and having beveled ends, corner-uprights into which the beveled ends of the wall-boards are inserted, and means for connecting said uprights, whereby close joints are formed at the corners and the wall-boards held against lateral displacement, substantially as set forth.

2. In a portable house, the combination of wall-boards arranged to form miter-joints at the corners, rectangular corner-uprights within which the miter-joints are formed, and means for connecting said uprights, substantially as set forth.

3. In a portable house, the combination with the wall-sills, walls, and roof-boards, of uprights secured to the sills for securing the wall-boards, said uprights having projections extending above the roof-boards, and tie-boards extending across the roof-boards for securing the uprights together and for holding down the roof-boards, substantially as set forth.

4. In a portable house, the combination with wall-sills, walls, and roof-boards, of uprights secured to the sills for securing the wall-boards, said uprights having projections extending through slots in the end roof-boards, and tie-boards extending across the roof-boards and provided with slots through which said projections also extend, and means for securing said tie-boards in position, substantially as set forth.

5. In a portable house, the combination of wall-sills A, B, having mortised joints, the tenons $b$ of sill-pieces B projecting through sill-pieces A, corner-uprights consisting of rectangular pieces having mortised extensions $c$ engaging tenons $b$, said uprights securing the wall-boards in position, and extensions $c'$ projecting above the roof-boards, tie-boards extending across the roof-boards and mortised to said uprights, and means for securing the mortised joints, substantially as set forth.

6. In a portable house, the combination of wall-sills A, B, having mortised joints, the tenons $b$ of sill-pieces B projecting through sill-pieces A, corner-uprights consisting of rectangular pieces having mortised extensions $c$ engaging tenons $b$, said uprights securing the wall-boards in position, and extensions $c'$ projecting through slots in the end roof-boards, tie-boards extending across the roof-boards and provided with slots through which said extensions $c'$ also extend, and means for securing all joints, substantially as set forth.

7. A door-sill for portable houses, consisting of a subsill cut to fit wall-boards having beveled ends and having means for holding it in position, and a slotted top sill, the projections formed by the slots at both ends extending on opposite sides of the wall-boards, substantially as set forth.

8. A door-casing having in combination separable interlocking jamb, lintel and sill pieces, substantially as set forth.

9. A door-casing having in combination separable interlocking jamb, lintel and sill pieces, and said jamb-pieces being interchangeable and reversible, whereby a door hung to either of the jamb-pieces may be arranged to swing in different directions without rearranging the hinges on the jamb, substantially as set forth.

10. In a portable house, the combination with the walls, of a roof formed of separable tongue-and-grooved boards, said tongues and grooves being provided with interlocking means to prevent relative longitudinal movement of the boards, substantially as set forth.

This specification signed and witnessed this 9th day of April, 1901.

CHARLES P. MOTT.

Witnesses:
GEO. A. SWEPENISER,
WILLIAM F. BECK.